Dec. 20, 1966   J. C. LEIBELT   3,292,766
AUTOMATIC BALE ALIGNER
Filed Dec. 8, 1964   3 Sheets-Sheet 1

INVENTOR.
JOHN C. LEIBELT
BY
LAZO & BARRY
ATTORNEYS

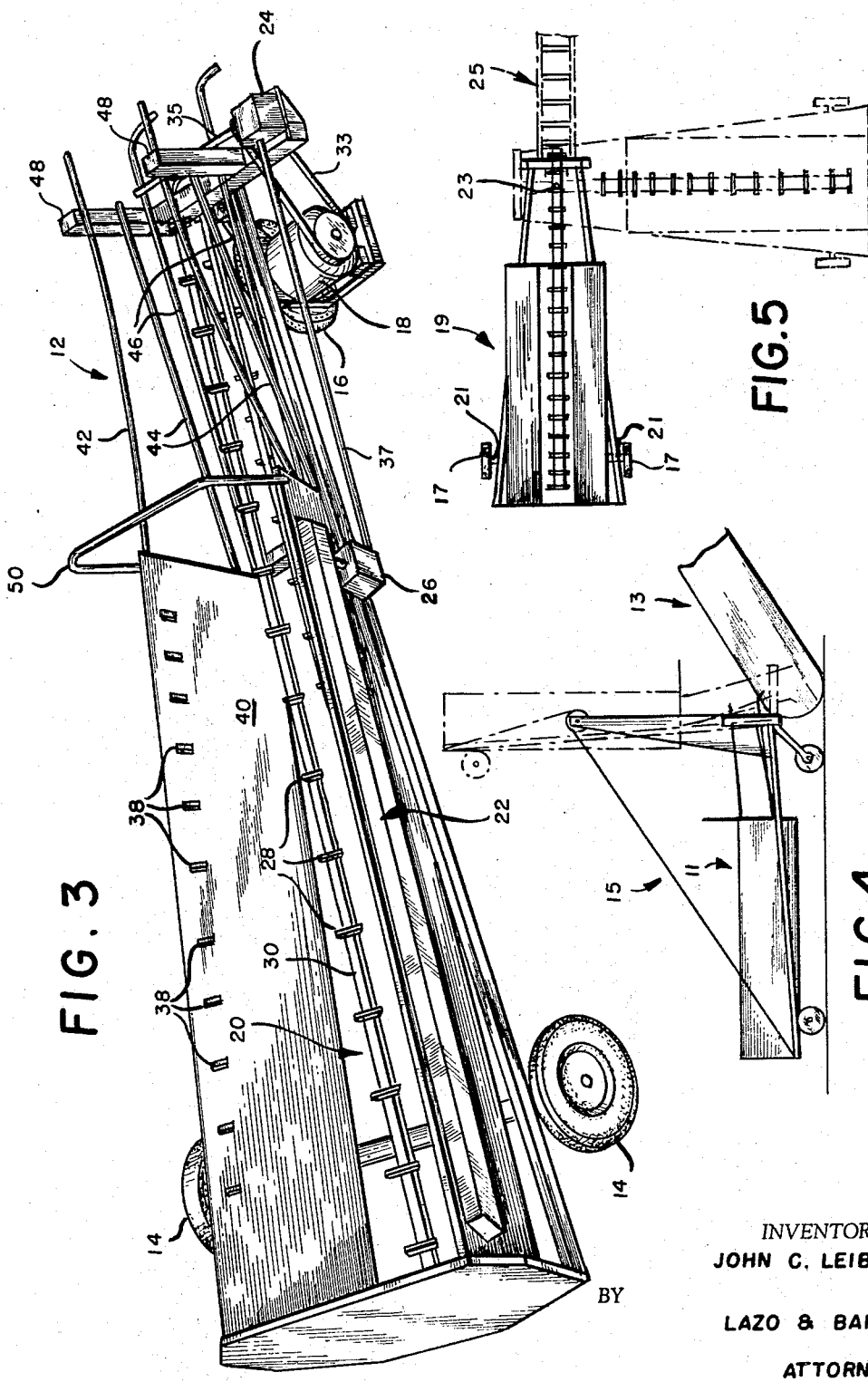

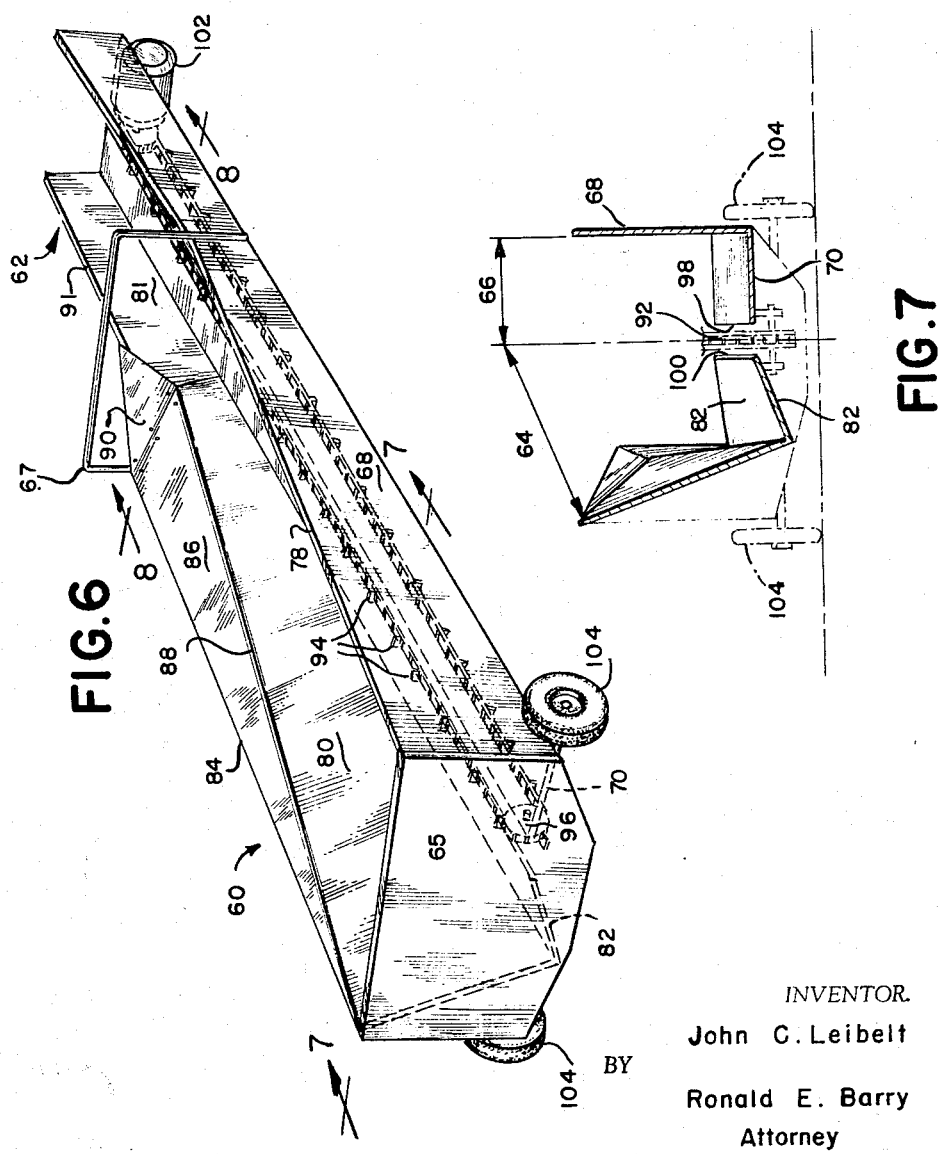

United States Patent Office 3,292,766
Patented Dec. 20, 1966

3,292,766
AUTOMATIC BALE ALIGNER
John C. Leibelt, 4020 Lake Ave.,
Wisconsin Rapids, Wis. 54494
Filed Dec. 8, 1964, Ser. No. 416,690
15 Claims. (Cl. 198—33)

This is a continuation-in-part application of Serial No. 342,630, filed February 5, 1964, now abandoned.

This invention relates to an aligning device for catching and aligning randomly-dropped articles and delivering them to a conveyor and particularly to the unloading of randomly-loaded hay bales and automatically aligning such bales for delivery to the elevator at a storage area.

The development of the bale thrower to hay baling equipment such as made by the New Holland Company has more than doubled the rate of speed of loading bales in wagons in the field. In these systems, the wagon is pulled behind the baler and the bales are thrown automatically from the baler into the wagon in a randomly-arranged pile. This eliminates completely the requirement of having a person standing in the wagon to stack the bales. Once the wagon is filled, it is taken to the storage area and the bales are either manually dropped from the wagon to the elevator or they are dropped onto the ground next to the elevator and manually loaded into the elevator. A bottleneck occurs at the elevator because the wagons can be loaded at a faster rate in the field than they can be unloaded into the elevator.

The primary object of the present invention is to automate the baling procedure from the field to the storage area.

Another object of the present invention is to provide an automatic bale aligner for receiving bales from the wagon and delivering them to the elevator.

A further object of the present invention is to eliminate the bottleneck at the storage area in the baling procedure.

Another object of the present invention is to make it possible for a single worker to accomplish the entire baling operation.

A still further object of the present invention is to provide a low cost, simple to operate unit for aligning and delivering bales to an elevator at the storage area.

These objects are accomplished by providing a hopper-type attachment to the elevator at the storage area. This hopper is designed for movement out of the normal path of a wagon as the wagon is drawn up to the elevator and is then positioned across the rear portion of the wagon for receiving the bales. The bales which may be either stacked or randomly piled in the wagon are automatically dropped from the rear of the wagon into the hopper. There are many commercially available wagons for dropping the bales off of the end, such as the false front or endless chain types. As the bales drop into the hopper, they are automatically aligned and righted and delivered to the elevator. The hopper is of a V-shaped design having a main conveyor at its lower vertex and a secondary conveyor on one of its sides. Most of the bales which drop from the wagon will drop in such a manner that their longitudinal axes will be directed in the same direction as the main conveyor. Those bales which drop into the hopper with their longitudinal axes transverse to the axis of the main conveyor may lodge in the upper portion of the V of the hopper. The secondary conveyor is designed to move one end of these bales in the opposite direction so that they will turn with their longitudinal axes parallel to the axis of the main conveyor and drop to the bottom of the hopper. If a second bale is dropped on top of a bale that is moving along the hopper, a re- straining bar is provided to hold back the top bale so that only one reaches the elevator at a time. The speed of operation of the main conveyor can be coordinated to the speed of delivery of the wagon so that the bales are moved constantly out of the path of the bales that drop from the wagon.

These objects can also be accomplished by providing a hopper having one vertical side and one angled side, the vertical side extending upward at approximately a right angle from a horizontal base and the angled side extending upward at approximately a right angle from an angled base. The top portion of the angled side may be flared outward so that the distance across the top of the hopper is substantially constant as the angled side approaches a vertical position. A conveyor is positioned between the two bases to move the bales through the hopper. Bales that drop into the hopper with their longitudinal axes transverse to the longitudinal axis of the conveyor will always drop with one end on the bottom of the hopper due to the presence of a vertical side opposite the angled sides. It has been found that as long as one end of the bale drops to the bottom of the hopper, the motion of the conveyor will be sufficient to turn the bale to an axial position.

Other objects and advantages will become more readily apparent when the following detailed description is read in conjunction with the accompanying drawings, in which:

FIG. 3 is an orthogonic projection of the bale aligner.

FIG. 4 is a side view of an elevating system for moving the automatic bale aligner out of the path of the wagons.

FIG. 5 is a second view of a method of moving the aligner out of the path of the wagon.

FIG. 6 is a perspective view of a modified bale aligner.

FIG. 7 is a view taken on line 7—7 of FIG. 6 showing the relation of the sides to one another.

FIG. 8 is a view taken on line 8—8 of FIG. 6 showing the relation of the sides near the discharge end of the modified hopper.

Figure 1:
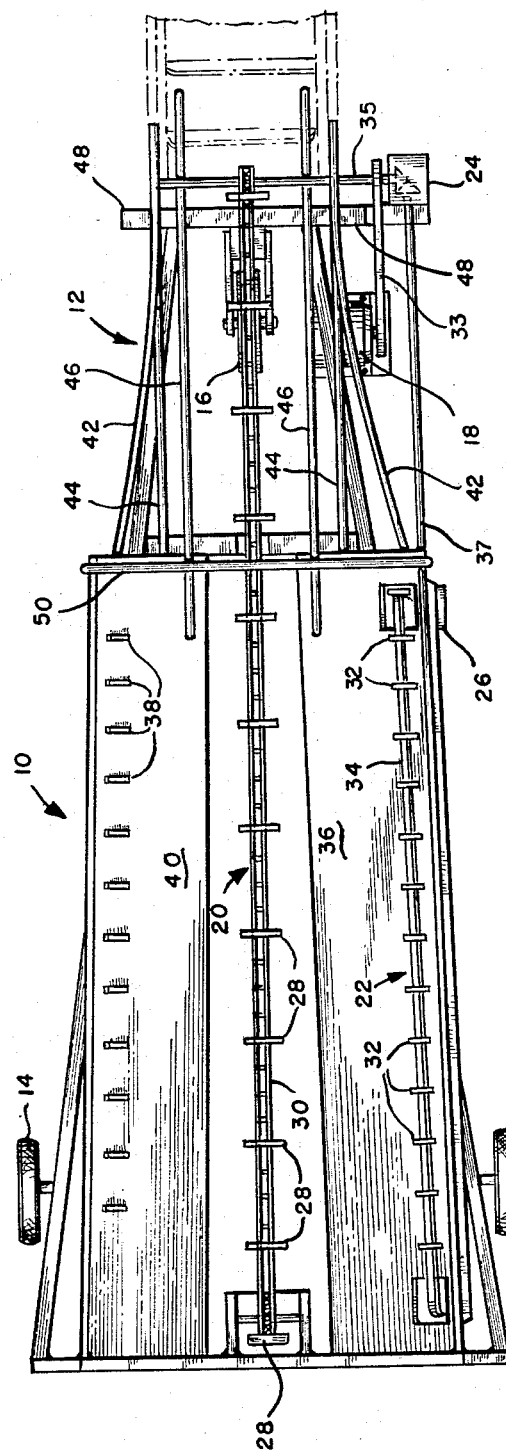
FIG. 1 is a top view of the automatic bale aligner.
Figure 2:
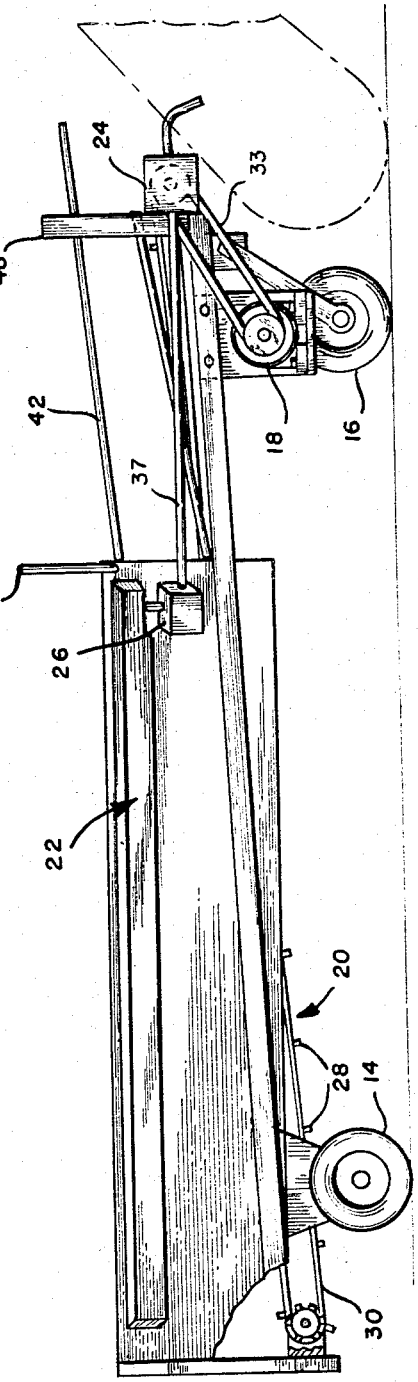
FIG. 2 is a side view of the automatic bale aligner with one of the sides partly broken away.

Referring more particularly to the drawings, the automatic bale aligner includes a hopper or aligning section 10 and a righting section 12. The aligning section is made the same length as the width of a conventional wagon which is approximately eight feet but this can be varied to any required size. A pair of wheels 14 are secured to the hopper section and a single wheel 16 to the righting section for moving the bale aligner out of the path of the wagon. This can be better understood if it is realized that the elevator to the storage area is generally stationary and the wagons are brought up to the elevator in a path transverse to the longitudinal axis of the elevator. In order to maintain this procedure, it was necessary to design the bale aligner so that it could be moved out of this path as the wagons are brought up to the elevator and then the bale aligner brought into position across the rear of the wagon. In FIGS. 1 and 2, the bale aligner is shown having a pair of wheels on the hopper section and a single pivotal wheel on the righting section for moving the bale aligner out of the path of the wagon. FIGS. 4 and 5 show alternate methods of moving the bale aligner out of this path. In FIG. 4 aligner 11 is pivotally attached to elevator 13 and is raised by means of a pulley or spring arrangement 15 to a vertical position with respect to the elevator. In FIG. 5, wheels 17 on the aligner 19 are pivotally mounted on shafts 21 and the front of the aligner is mounted on a vertical pivot 23 on elevator 25 so that the bale aligner can be pivoted to one side or the other to clear the path for the wagons.

Once the bale aligner is moved into position, an independent electric motor 18 is started and drives the main conveyor 20 and a secondary conveyor 22 by means of a belt 33 through gear box 24 and 26 and drive shafts 35 and 37. The main conveyor has a number of cleats 28 secured at regular intervals to chain 30 and travels along the longitudinal axis of the hopper toward the elevator. The secondary conveyor has a number of cleats 32 secured to chain 34 at regular intervals and is positioned in the side wall 36 of the hopper and driven in the opposite direction to the main conveyor. The secondary conveyor is spaced from the main conveyor a distance greater than the height of the standard bale so that it will not engage bales that are moving on the main conveyor. As bales are dropped into the hopper, they will fall with their axes parallel to the longitudinal axis of the hopper or transverse to the longitudinal axis of the hopper. If they fall parallel, they will fall onto the main conveyor and be carried toward the elevator. If the bale falls with its axis transverse to the longitudinal axis of the hopper and one end slides down the side wall onto the main conveyor, that end will be carried by the main conveyor to the elevator. The upper end, if it is resting on side wall 36, will be engaged by the secondary conveyor which is rotating in the opposite direction and will be pulled away from the elevator so that it falls onto the conveyor. If the upper end is resting on side wall 40, the friction caused by the sliding motion of the bale as it moves toward the elevator will hold the upper end back so that the bales fall onto the conveyor. In the event that this frictional force is insufficient to hold the bales back, a row of cleats 38 may be secured to the upper portion of the side wall to hold the upper end of the bale back. In either event, the bale will be turned so that its axis is parallel to the longitudinal axis of the conveyor.

Finally, if a bale drops onto the side walls in a transverse relation to the main conveyor but suspended between the side walls out of engagement with the main conveyor, one end of the bale will be engaged by the secondary conveyor. The motion of the secondary conveyor will pull the engaged end away from the elevator and the opposite end will be held stationary by the frictional force of the side walls. If the stationary cleats are provided on the opposite side wall, they will help to hold the end of the bale so that it will be twisted to a parallel position.

Since the side walls of the hopper are in a V shape spreading outward at approximately a 45° angle with respect to a vertical plane through the center of the hopper, the bales will leave the hopper section with no side parallel to the ground but instead forming an angle with a horizontal plane. A righting section is, therefore, provided to right the bales before they are delivered to the main elevator causing the bales to be aligned so that the sides of the bales are parallel with the sides of the elevator. This righting section includes a number of pairs of righting bars 42, 44 and 46. Bars 42 are secured to the tops of the ends of the side walls and are curved to engagement with vertical members 48. Bars 44 are secured to the central portion of the end of the side wall and to the vertical members 48 and bars 46 to the bottom of the side walls straight back to the vertical members 48. The vertical members are spaced apart sufficiently to allow the bales to pass through to the elevator. The righting section, therefore, constitutes a continuation of the side walls back to the vertical sections 48 so that the bales are vertically aligned as they pass through the vertical section. The righting section was found necessary to ensure that the bales would fall directly onto conveyor 25 in the elevator. It is conceivable that the side walls of the hopper could be continued back to a narrow section for dropping onto a wider elevator but the possibility does exist that if dropped at a 45° angle, they will fall outward onto the side walls of the elevator, rather than inward, and directly onto the conveyor.

The bale aligner is designed to operate at a speed somewhat faster than the speed of delivery of the bales from the wagon. In the event bales should become stacked in the hopper so that two bales, one on top of the other, are being carried forward in the hopper, or a bale is being carried forward on end, a stop bar 50 is secured to the tops of the ends of the side walls to engage and hold back such bales. The stop bar will hold the upper bale stationary until the conveyor pulls the bale out from under the upper bale; or the stop bar will cause a bale to tip backwards onto its sides if carried forward on end.

This device has been operated satisfactorily with very little jamming. A single operator can unload a wagon in a matter of minutes and must be in attendance only to guide the bales into the aligner when they are stacked too high on the wagon and to control the drive motors for the elevator, aligner and wagon. In operation once the wagon and aligner are properly in position, the elevator conveyor is started first. Once it is operating satisfactorily, the aligner conveyors are started. If the aligner is driven off of the elevator, it will naturally start running at the same time as the elevator. The operator then starts the unloading system for the wagon. The rate of unloading must be controlled to prevent the possibility of the bales dropping to the hopper at too fast a rate.

In FIGS. 6, 7 and 8, a modified bale aligner is shown having a hopper section 60 and a righting section 62. The hopper section is divided into a receiving side 64 and an aligning side 66 with one end of the hopper closed by end wall 65. A stop bar 67 is secured to the intersection of the hopper section with the righting section to prevent any transversely moving bales from entering the righting section. The aligning side includes a substantially vertical side wall 68 mounted on the outer edge of a substantially horizontal base or bottom wall 70 so that the side wall and bottom wall are at substantially right angles. The vertical side wall extends the full length of both the hopper section and the righting section and is gradually tapered in width from the hopper section toward the righting section. The top edge 78 of the vertical side wall will always be at the same level from the ground throughout its full length.

The receiving side includes a side wall 80 mounted on the outer edge of base or bottom wall 82 with the side wall 80 and base 82 intersecting at substantially a right angle. The base or bottom wall 82 is angled downward from the plane of bottom wall 70 with the side wall 80 angled outward from the center of the hopper. The angled side wall 80 also extends the full length of the hopper and righting section but is flared outward at the top as described hereinafter.

The angle of inclination of side wall 80 gradually approaches a vertical relation as it goes from end wall 65 toward the connection of the hopper section with the righting section. A top section 86 of side wall 80 is flared outward from its line of intersection 88 with the side wall with the top section increasing in width as it reaches the intersection of the hopper section with the righting section. The top edge 84 of top section 86 will always be at substantially the same height as top edge 78 of side wall 68 and substantially parallel thereto up to the intersection of the hopper section with the righting section. In the righting section, side wall 81 which is a continuation of side wall 80 is turned to a complete vertical position with top section 86 connected to the top of side wall 81 by triangular member 90. The top edge 89 of the triangular member and top edge 91 of side wall 81 are also at the same height as edge 78 of side wall 68.

A conveyor chain 92 having lugs 94 intermittently spaced along its length is mounted for longitudinal motion in the hopper section on rollers 96 on each end of the hopper so that it moves in the gap between edge 98 of bottom wall 70 and edge 100 of bottom wall 82. The conveyor is driven by any convenient power source such as motor 102. Wheels 104 are provided on the back and a single wheel 106 is provided in the front for moving the hopper. The righting section can be attached to a barn elevator by any appropriate connecting device to ensure that the properly aligned bales are deposited in the elevator.

In operation, a wagon is backed against side wall 80, and the motor for the conveyor is started. Bales are dropped onto the flared top section 86 of side wall 80 from the wagon, preferably by mechanical means to speed up the unloading. The majority of the bales will fall with their longitudinal axes at less than 90° with respect to the longitudinal axis of the hopper and will automatically slide to a position where their longitudinal axes are in a parallel relation to the longitudinal axis of the hopper.

Bales which fall into the hopper with their longitudinal axes transverse of the longitudinal axis of the hopper present the greatest problem. The bale aligners described above overcome this problem by providing a second conveyor or by adding gripping devices to the inside surface of the side wall. In this embodiment, the angular arrangement of the side wall 80 to the base or bottom wall 82 and vertical side wall 68 is so selected that it is impossible for a bale to drop into the hopper without having some portion of the end of the bale drop into engagement with the conveyor at the bottom of the hopper. As the end of a bale engages the conveyor, it will be moved along the bottom of the conveyor until the upper end lags behind far enough for it to fall of its own weight to the bottom of the hopper. If a bale is still moving in a transverse relation to the longitudinal axis of the hopper section as it starts to enter the righting section, cross bar 67 will prevent the top of the bale from passing until it is far enough behind the lower end to fall into the conveyor.

Although only a few embodiments of the present invention have been shown and described, it should be apparent that various changes and modifications can be made in the aligner without departing from the scope of the appended claims.

What is claimed is:
1. An aligning device comprising
an aligning section having outwardly flared side walls for receiving randomly arranged rectangular objects, and a righting section having side walls forming a continuation of the side walls of the aligning section to right the bales so that the sides of the bales are substantially parallel to the side walls of the righting section as the bales pass through the section,
conveyor means mounted to travel through the aligning and righting sections to carry said objects through said sections, and
secondary conveyor means in said side walls for turning transversely suspended objects toward a longitudinally aligned position.

2. An aligning device according to claim 1 wherein said secondary conveyor means is driven in a direction opposite to that of said main conveyor.

3. An aligning device according to claim 1 wherein said main conveyor and said secondary conveyor are driven simultaneously from a common power source.

4. An automatic bale aligning device for receiving randomly-arranged rectangular bales and delivering them to a storage elevator, comprising
a hopper section for catching the bales and having outwardly flared side walls and an end wall at one end,
a main conveyor mounted between the side walls for carrying the bales toward the other end of the hopper section,
a secondary conveyor mounted near the top of one of the side walls,
power means for driving said conveyors in opposite directions, whereby said secondary conveyor pulls one end of the bales toward the closed end of the hopper section until the bale is parallel to the main conveyor, and
means for connecting the other end of said hopper section to the elevator, whereby said conveyor drops said bales onto the elevator.

5. An automatic bale aligning device according to claim 4 wherein said connecting means includes
a righting section forming a continuation of said side walls, said righting section including means for continuing the tops of the side walls toward a vertically aligned relation with an extension of the bottom of the side walls.

6. An automatic bale aligning device according to claim 5 including
a number of cleats longitudinally arranged in the upper portion of the side wall opposite from said one side wall to hold the ends of bales resting on the side wall with the cleats that are not aligned with the longitudinal axis of the hopper section, whereby they are twisted to a parallel relation by the forward motion of the main conveyor.

7. An automatic bale aligning device according to claim 6 wherein the hopper section is longer than the width of the wagon and the distance between the top of the side walls is greater than the length of the bales.

8. An automatic bale aligning device according to claim 6, including
stop means bridging the gap between the side walls at the other end of the hopper for stopping the motion of bales located on bales on the conveyor until the lower bale is clear of the stop means.

9. An automatic bale receiving, aligning and delivering device for transporting bales from a wagon to a storage elevator, comprising
a hopper having outwardly flared side walls and an end wall at one end,
a conveyor located at the vertex of the side walls,
twist means in said side walls for turning transversely arranged bales to a longitudinal position, and
means for driving said main conveyor to transport parallely turned bales through the other end of the hopper.

10. An automatic baler according to claim 9 including means for righting the bales as they leave the hopper.

11. An automatic baler according to claim 10 wherein said twist means includes a second conveyor moving in the opposite direction to the main conveyor.

12. An automatic bale aligning device for receiving randomly-arranged rectangular bales and delivering them to a storage elevator, comprising
a hopper having a pair of side walls, a pair of bottom walls and an end wall, one of said side walls being substantially vertically arranged and intersecting one of said bottom walls at substantially a right angle, the other of said walls flaring outwardy and the other of said bottom walls being angled downward from said one bottom wall and intersecting said outwardly flared side wall,
and a conveyor positioned between said bottom walls for transporting bales dropped onto said outwardly flared side wall through said hopper.

13. An aligning device according to claim 12 wherein said outwardly flared side wall approaches a vertical relation from the end of the hopper having the end wall toward the other end of the hopper.

14. An automatic bale aligning device for receiving randomly-dropped rectangular bales and delivering them to a storage elevator, comprising
a hopper section divided into a receiving section and an abutment section, the abutment section including a first vertical side wall and a first horizontal bottom wall, the receiving section including a second side wall and a second bottom wall secured together at their line of intersection, said second side wall and second bottom wall being twisted from a substantially vertical and horizontal relation at one end to an outwardly angled relation at the other end with the angle between the second side wall and second bottom wall remaining substantially the same throughout the length of the hopper section, conveyor means mounted in the intersection of the first and second bottom walls, and power means for driving said conveyor means to move bales dropped on said receiving side out of said hopper.

15. An automatic bale aligning device according to claim 14 wherein said second side wall includes an outwardly flared top section of increasing width from said other end toward said one end.

References Cited by the Examiner

UNITED STATES PATENTS

| 1,854,561 | 4/1932 | Owens et al. | 198—204 |
| 2,718,296 | 9/1955 | Johnson | 198—204 |

FOREIGN PATENTS

| 257,440 | 9/1926 | Great Britain. |

EVON C. BLUNK, *Primary Examiner.*

SAMUEL F. COLEMAN, *Examiner.*

R. E. KRISHER, A. C. HODGSON, *Assistant Examiners.*